(12) United States Patent
Beber et al.

(10) Patent No.: US 10,464,166 B2
(45) Date of Patent: Nov. 5, 2019

(54) SYSTEM FOR VIEWING AN AREA FOR PROCESSING MATERIALS USING LASER APPARATUSES

(71) Applicant: SISMA S.P.A., Piovene Rocchette (IT)

(72) Inventors: Franco Beber, Torrebelvicino (IT); Federico Cumerlato, Torrebelvicino (IT)

(73) Assignee: SISMA S.P.A., Piovene Rocchette (IT)

( * ) Notice: Subject to any disclaimer, the term of this patent is extended or adjusted under 35 U.S.C. 154(b) by 831 days.

(21) Appl. No.: 15/003,144

(22) Filed: Jan. 21, 2016

(65) Prior Publication Data

US 2016/0219191 A1    Jul. 28, 2016

(30) Foreign Application Priority Data

Jan. 22, 2015   (IT) .............................. VR2015A0011

(51) Int. Cl.
  *H04N 5/04*       (2006.01)
  *H04N 5/232*      (2006.01)
  *B23K 26/03*      (2006.01)

(52) U.S. Cl.
  CPC ................................. *B23K 26/032* (2013.01)

(58) Field of Classification Search
  CPC .......................... B23K 26/032; B23K 26/044
  See application file for complete search history.

(56) References Cited

U.S. PATENT DOCUMENTS

| | | | |
|---|---|---|---|
| 4,649,426 A | 3/1987 | Bolstad | |
| 2003/0081201 A1* | 5/2003 | Shibata | G01N 21/33 356/237.2 |
| 2004/0124227 A1 | 7/2004 | Seki et al. | |
| 2008/0158348 A1* | 7/2008 | Karpen | A61B 1/00036 348/82 |

OTHER PUBLICATIONS

S.K. Lee, et al. "A study on Automatic Seam Tracking in Pulsed Laser Edge Welding by Using a Vision Sensor Without an Auxiliary Light Source", Journal of Manufacturing Systems, vol. 21, No. 4, Jan. 1, 2002, pp. 302-315.

* cited by examiner

*Primary Examiner* — Mainul Hasan
(74) *Attorney, Agent, or Firm* — Pearne & Gordon LLP

(57) ABSTRACT

A system (1) for viewing an area (2) for processing materials using laser apparatuses, including acquisition apparatus (6) configured for acquiring one image at a time of the processing area (2) and for generating an acquisition signal (8) containing the data relating to each image acquired. The system (1) includes a screen (9) for viewing the images acquired connected to the acquisition apparatus (6) and configured to receive the acquisition signal (8) and to make visible to the users the images contained therein. More specifically, the system (1) is configured for displaying on the display screen (9) the last image acquired in a pause period ($T_P$) from the laser emission and to keep displayed on the screen the last image acquired during the subsequent obscuring period ($T_{STOP}$).

13 Claims, 4 Drawing Sheets

SYSTEM FOR VIEWING AN AREA FOR PROCESSING MATERIALS USING LASER APPARATUSES

This invention relates to a system for viewing an area for processing materials using laser apparatuses, an apparatus for processing materials by emitting laser radiation and a method of viewing an area for processing materials with laser radiation.

More specifically, this invention relates to machines or systems which use the emission of laser radiation to perform various types of processing such as, for example, welding, marking, cutting, etc. Preferably, this invention is directed to the laser welding sector.

Even more in particular, this invention relates to the system for viewing the processing area where the laser radiation is concentrated.

According to the prior art, two types of systems are used for viewing the processing area: direct viewing systems (for example, a microscope) or indirect viewing systems (for example by acquiring images using an analogue or digital video camera and displaying on a monitor).

In both these types of systems, it should be noted that the operator is disturbed by the light emission produced by the meeting between the laser radiation and the material to be processed. Consequently, in order to resolve this problem systems are currently used to mask the light emission which consist in using a sort of optical shutter. The shutter is interposed between the viewing system and the processing area and is configured to be closed during the light emission and open between one light emission and the next. In this way, the shutter remains closed during the light emission, thus avoiding problems to the eyes of the user who is observing the processing area. During the closing of the shutter, the viewing system reproduces a blank (black) image. For this reason, a blank image is displayed during the laser emission, whilst images of the processing area are displayed between one laser emission and the next.

However, this prior art technology is not free of drawbacks.

In particular, even though the time the shutter remains closed is brief, this is in any case sufficient to generate a view which is not very clear and is "jerky". The image of the processing area is in fact alternated with blank images created by the shutter, achieving annoying effect for the human eye and tiring if the view is prolonged over time.

In this situation, the aim of this invention is to make a system for viewing an area for processing materials using laser apparatuses which overcomes the above-mentioned drawbacks.

More specifically, the aim of this invention is to make a system for viewing an area for processing materials using laser apparatuses which allows the stress to be reduced of the human eye observing the processing area.

The aim of this invention is also to make a system for viewing an area for processing materials using laser apparatuses which allows the physical is health to be improved of the human eye observing the processing area.

The aims indicated are substantially achieved by a system for viewing an area for processing materials using laser apparatuses as described in the appended claims.

Further characteristic features and advantages of this invention will emerge more clearly from the detailed description of several preferred, but not exclusive, embodiments of a system for viewing an area for processing materials using laser apparatuses illustrated in the accompanying drawings, in which.

Figure 1A:
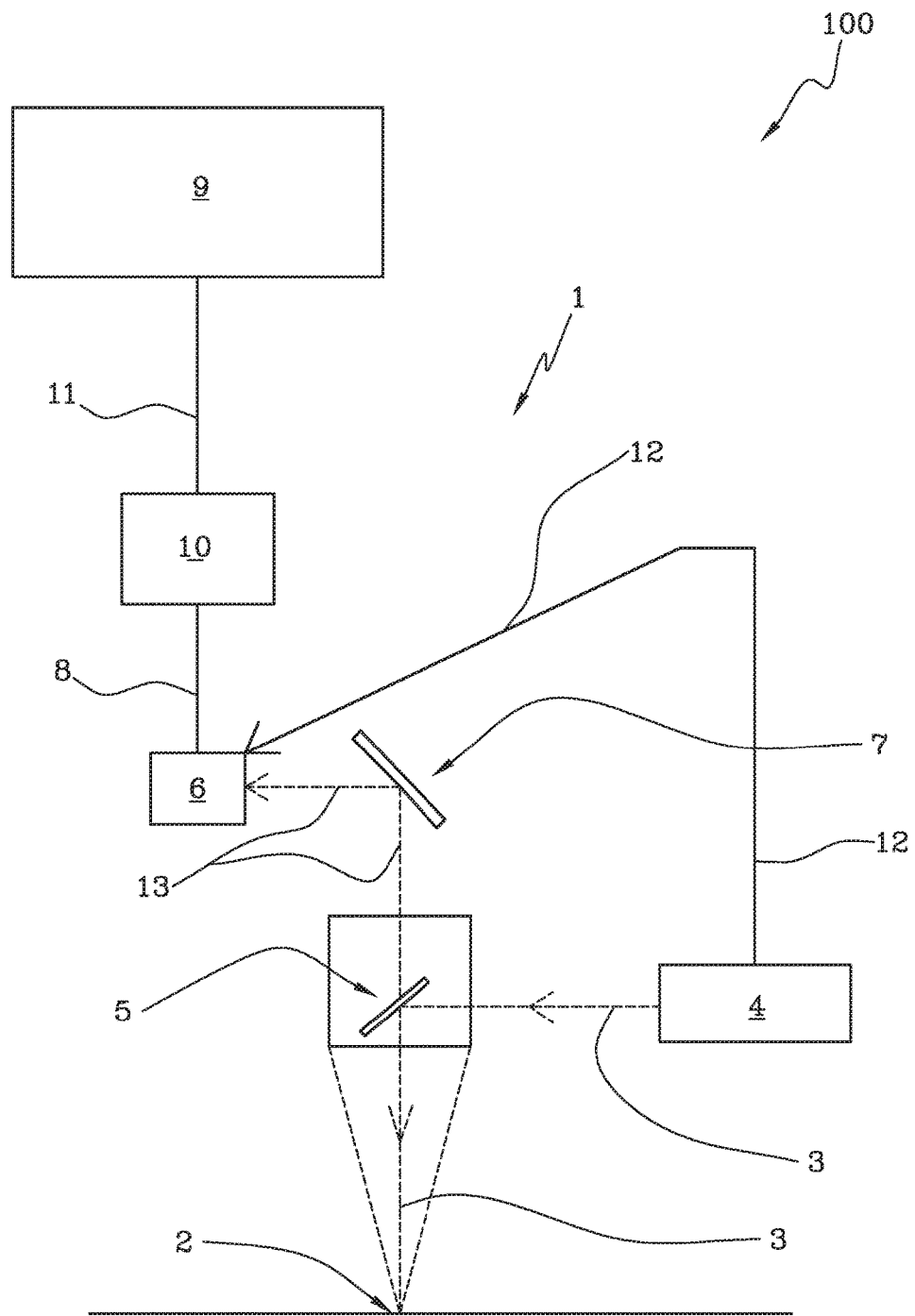
FIG. 1a shows a schematic view of a first operating configuration of the viewing system and thethe apparatus for processing materials by emitting laser radiation according to this invention.

With reference to the above-mentioned figures, the numeral 1 denotes in its entirety a system or viewing system for viewing an area 2 for processing materials using laser apparatuses according to this invention.

More specifically, a laser apparatus 100 or apparatus 100 for processing materials by emitting laser radiation 3 comprises a laser emitting device 4 configured to emit laser radiation 3 towards an area 2 for processing the material. In other words, the laser emitting device 4 comprises a laser generator which is able to emit radiation towards a processing area 2.

Figure 2:
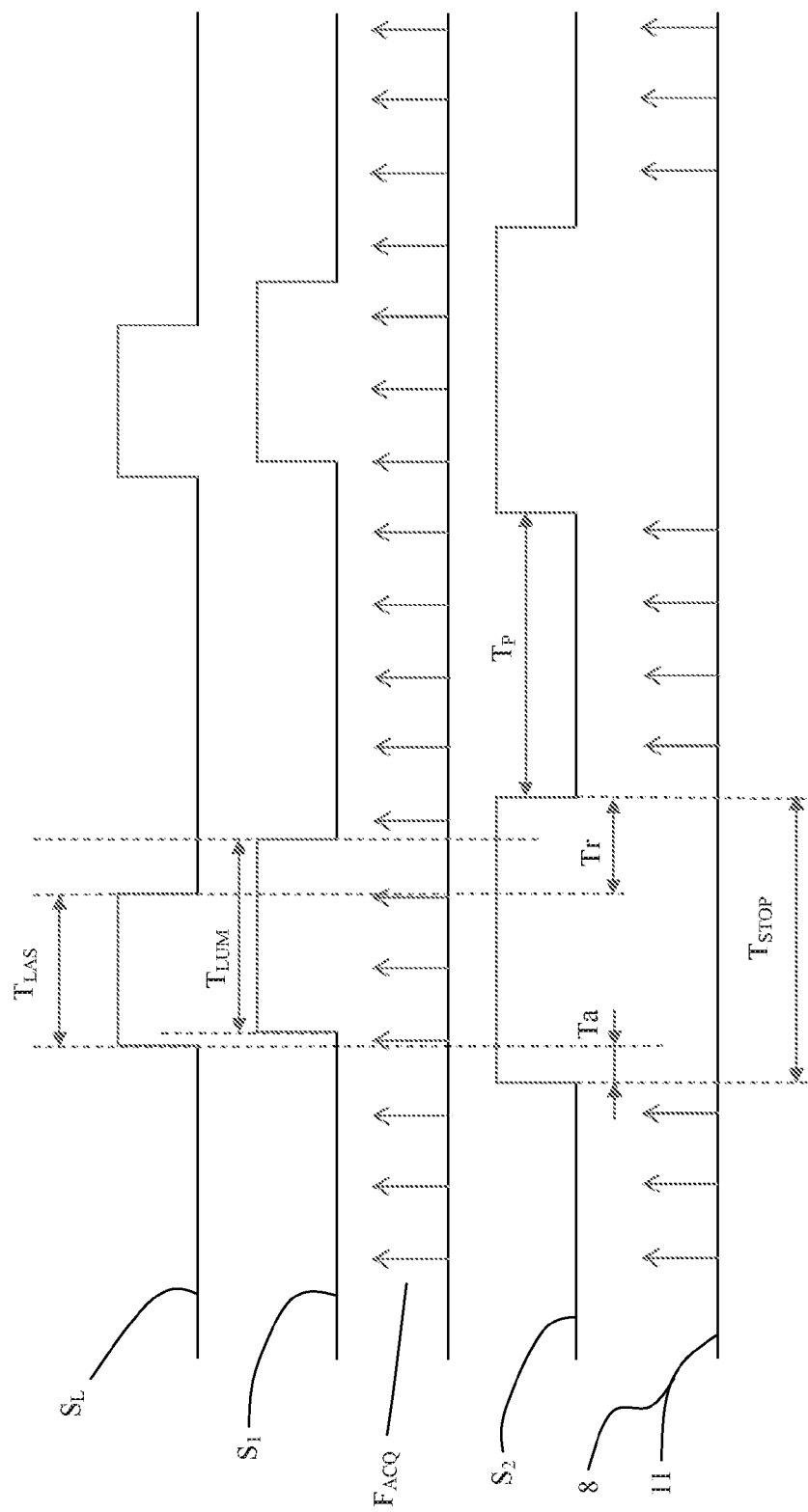
FIG. 2 shows a schematic view of a representation of the trend over time of the signals involved in the viewing system according to this invention.

It should be noted that the laser emission device 4 operates in a discrete manner emitting the laser radiation 3 only during predetermined periods of time, hereafter referred to as the "laser emission times $T_{LAS}$". A pause time $T_P$ is usually interposed between two laser emission times $T_P$, as explained in more detail below. FIG. 2 shows a laser emitting signal $S_L$ which shows the trend over time of the laser radiation.

Preferably, the laser radiation 3 coming from the generator is diverted towards the processing area 2 by means of at least one inclined reflective surface 5. Even more preferably, the laser radiation 3 is diverted by 90° towards the processing area 2. Correspondingly, the reflective surface 5 (mirror) is positioned at 45° relative to a horizontal plane. In other embodiments not illustrated in this invention, the laser radiation 3 might be diverted by a different angle and the reflective surface 5 be positioned at a corresponding predetermined angle relative to a horizontal plane.

More specifically, the system 1 for viewing the processing area 2 is oriented towards the processing area 2 to detect the images of the materials being processed.

In that sense, the system 1 for viewing the processing area 2 comprises acquisition means 6 configured for acquiring one image (frame) at a time of the processing area 2 according to a predetermined acquisition frequency Facq (for example shown in FIG. 2). Preferably, the acquisition means 6 comprise an apparatus for acquiring images and/or videos. In other words, the acquisition means 6 are of the indirect type.

The acquisition apparatus comprises a video camera and/or a still camera preferably of digital type.

Moreover, the acquisition means 6 may comprise one or more reflective surfaces 7 interposed between the processing area 2 and the acquisition apparatus in such a way as to divert the light 13 coming from the processing area 2 towards the acquisition apparatus. Preferably, the reflective surfaces 7 comprise mirrors.

The acquisition means 6 are configured to generate an acquisition signal 8 (of an electrical type) containing the data relating to each image acquired. Moreover, the viewing system 1 comprises a screen 9 for viewing the is images acquired connected to the acquisition means 6 and configured to receive the acquisition signal 8 and to make visible, in real time, to the users the images contained therein.

Preferably, the display screen 9 is an LCD screen, but it could be a screen of another type not expressly described herein.

Figure 1B:
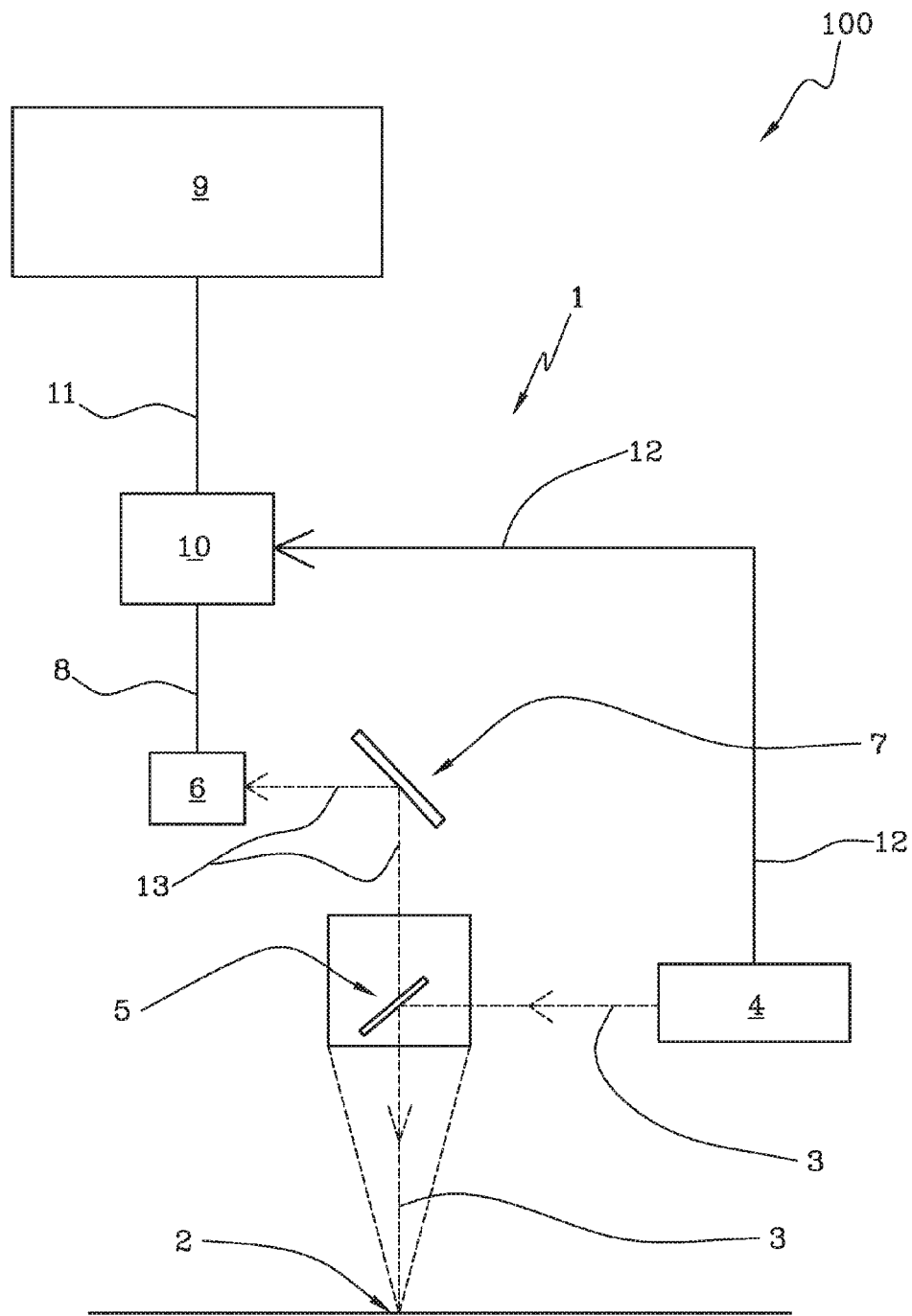
FIG. 1b shows a schematic view of a second operating configuration of the viewing system and thethe apparatus for processing materials by emitting laser radiation according to this invention.
Figure 1C:
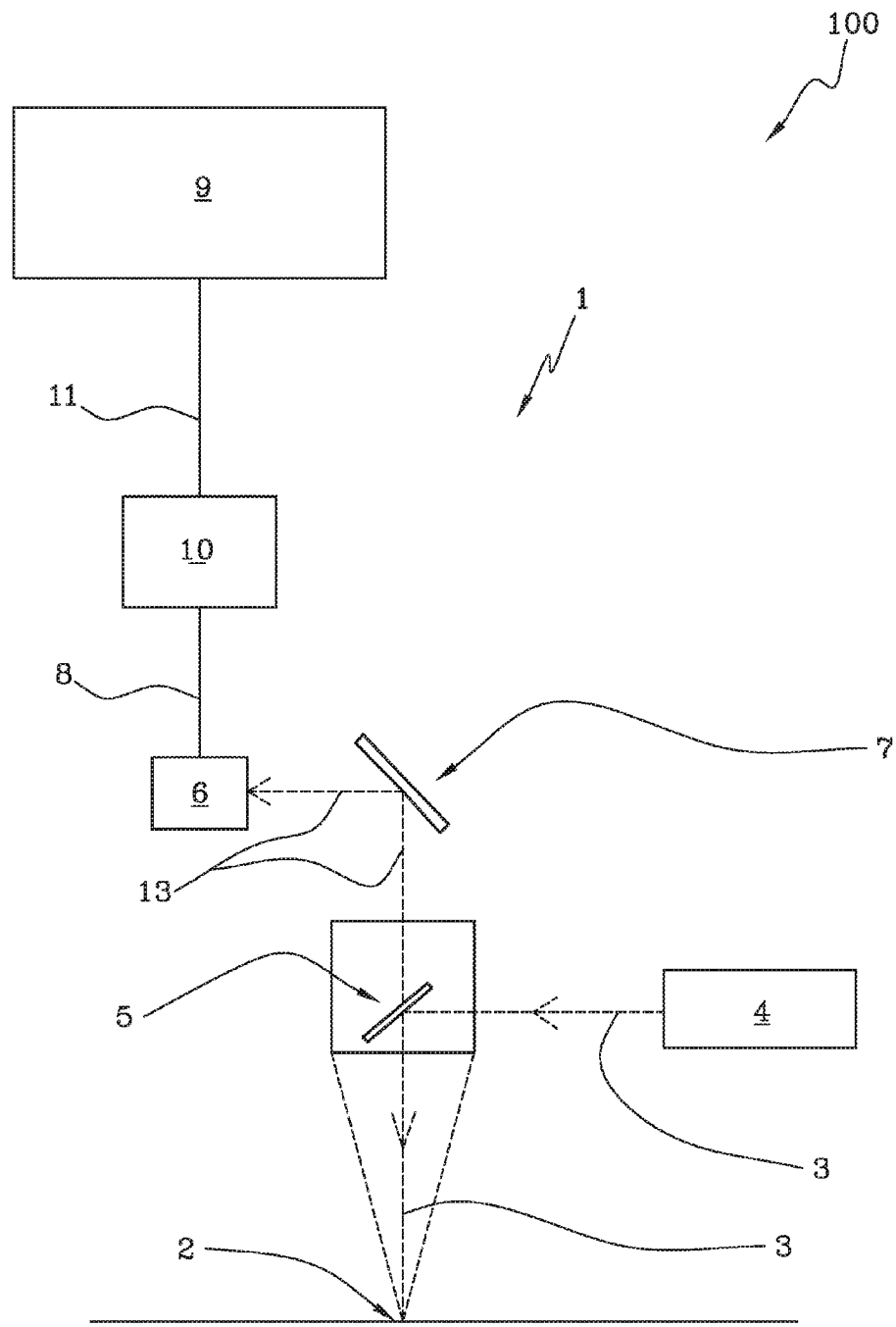
FIG. 1c shows a schematic view of a third operating configuration of the viewing system and thethe apparatus for processing materials by emitting laser radiation according to this invention.

In the preferred embodiment illustrated, for example, in FIG. 1, the system comprises a processing unit 10 interposed between the acquisition means 6 and the display screen 9 and connected to the latter. More specifically, the processing unit 10 is configured for:

receiving as input the acquisition signal 8;

processing it as a function of predetermined parameters;

sending as output a display signal 11 towards the display screen 9. The display signal 11 is representative of the images to display on the display screen 9, In particular, the display screen 9 is configured to receive the display signal 11 and display the contents on the same screen.

In detail, the system is configured in such a way that the viewing screen 9 displays the images of the processing area 2 only during pause periods $T_P$ each between respective obscuring periods $T_{STOP}$ for the emission of laser radiation.

In effect, as shown in FIG. 2, the emission of the laser radiation 3 produces emission slightly delayed relative to the laser emission time $T_{LAS}$. More specifically, the light emission ends after the emission of the laser radiation 3 due to the continuation of the incandescent step of the material processed. Consequently, the light emission is associated with a light emission time $T_{LUM}$ delayed relative to the laser emission time $T_{LAS}$. FIG. 2 shows a signal $S_1$ relative to the trend of the light emission over time.

The obscuring period $T_{STOP}$ is the period of time during which images are not displayed of the processing area 2 and covers at least the light emission time $T_{LUM}$ irrespective of the laser emission time $T_{LAS}$. For example, the laser emission device 4 could emit low power laser radiation which does not create a significant light emission. In other words, during the obscuring period $T_{STOP}$ the processing area 2 is not displayed. In other words, during the light emission time $T_{LUM}$ the processing area 2 is not displayed.

More specifically, the obscuring period $T_{STOP}$ starts before the laser emission time $T_{LAS}$ by an advance time Ta. The advance time Ta is a function of the acquisition frequency Facq of the acquisition means 6.

Moreover, the obscuring period $T_{STOP}$ ends after the laser emission time $T_{LAS}$ by a time delay Tr as a function of time during which the incandescence of the material continues (which depends also on the type of material). In other words, the time delay Tr is a function of the duration of the light emission time $T_{LUM}$.

Each pause period $T_P$ starts from the end of an obscuring period $T_{STOP}$ and ends at the start of the next obscuring period $T_{STOP}$. In practice, as is possible to see from FIG. 2, there is an alternation of time between pause periods $T_P$ and obscuring periods $T_{STOP}$.

It should be noted that the viewing system 1 can receive an obscuring signal 12 (or laser emission signal) representing the obscuring period $T_{STOP}$ (or the laser emission time $T_{LAS}$) or the duration of the obscuring period $T_{STOP}$ may be calculated independently as a function of the contents of the images acquired. In the first case (FIGS. 1*a* and 1*b*), the obscuring signal 12 (or laser emission signal) is generated by the laser emission device 4 and is sent by the latter to the viewing system 1.

In the second case (FIG. 1*c*), the viewing system 1, once it has detected the images, is configured for:

analysing the contents of the images;

detecting images with excesses of luminous contrasts (for example, black or white images);

determining the start time of the obscuring period $T_{STOP}$ corresponding to the moment in which the images with excesses of luminous contrasts have been detected;

determining the end time of the obscuring period $T_{STOP}$ corresponding to the moment in which images with excesses of luminous contrasts are no longer detected.

According to this invention, the viewing system 1 is configured for:

displaying on the viewing screen 9 the last image acquired for each pause period $T_P$;

keeping displayed on the screen the last image acquired during the subsequent obscuring period ($T_{STOP}$);

displaying on the viewing screen 9 the images acquired during the pause period $T_P$ following the obscuring period $T_{STOP}$.

In other words, the viewing system 1 is configured for displaying, during the obscuring period $T_{STOP}$, on the display screen 9, the last image acquired during the previous pause period $T_P$ in such a way that the user who observes the screen sees the last image acquired and not the blank or 'black' screen. Preferably, the last image acquired is stored in a memory unit of the viewing system in such a way that it can be kept visible during the obscuring period $T_{STOP}$.

In a first embodiment (shown in FIG. 1*a*), the acquisition means 6 are configurable between an active condition wherein they acquire the images at the acquisition frequency Facq and an inactive condition wherein they do not acquire any image. During the pause period $T_P$ the acquisition means 6 are configured in the active condition, whilst during the obscuring period $T_{STOP}$ the acquisition means 6 are configured in the inactive condition. In other words, during the active condition (corresponding to the pause period $T_P$), the acquisition means 6 acquire the images, whilst during the inactive condition (corresponding to the obscuring period $T_{STOP}$) the acquisition means 6 do not acquire images. FIG. 2 shows that the acquisition signal 8 does not contain the images acquired during the obscuring period $T_{STOP}$.

In practice, the acquisition means 6 are configured for generating the acquisition signal 8 containing the last image acquired of the pause period $T_P$ and sending the signal to the display screen 9 during the entire subsequent obscuring period $T_{STOP}$ in such a way that the display screen 9 displays this last image acquired during the obscuring period $T_{STOP}$.

In this first embodiment, the acquisition means 6 are configured to receive the obscuring signal 12 from the laser emission device 4 representing at least the time during which the light emission occurs in such a way as to determine the configuration of the acquisition means 6 (the first case described above—FIG. 1*a*).

Again in this first embodiment, the acquisition means 6 are configured for determining, as a function of the contents of the acquisition signal 8, the pause period $T_P$ and the obscuring period $T_{STOP}$ (the second case described above—FIG. 1*c*).

In a second embodiment (shown mainly in FIG. 1*b*), the acquisition means 6 are configured for acquiring the images at the predetermined frequency during both the pause periods $T_P$ and the obscuring periods $T_{STOP}$. In other words, the acquisition means 6 acquire without interruption the images of the processing area 2 irrespective of the laser emission time $T_{LAS}$ and light emission time $T_{LUM}$.

In this case, the processing unit 10 is configured for receiving the acquisition signal 8 (containing all the images acquired) and for generating a corresponding display signal 11 containing data relative to the images acquired solely during the pause periods $T_P$. In other words, the processing unit 10 is configured to reject the images contained in the acquisition signal 8 and acquired during the obscuring periods $T_{STOP}$. Moreover, the processing unit 10 is configured to make visible on the screen the last image acquired at the end of each pause period $T_P$ and contained in the corresponding acquisition signal 8 received, during the subsequent obscuring period $T_{STOP}$ irrespective of the images acquired by the acquisition means 6. In practice, the acquisition means 6 continue to acquire the images, but the display screen 9 makes visible only the images which fall inside the pause period $T_P$. In FIG. 2, the last signal at the bottom, represents, in the case of the second embodiment, the display signal 11 in which it is possible to see that the images acquired during the obscuring period $T_{STOP}$ are missing.

In this second embodiment, the processing unit 10 is configured to receive the obscuring signal 12 representing at least the time during which the light emission occurs in such a way that the processing unit 10 can interrupt the display of the images acquired during this period of time and generate a display signal 11 containing the last image acquired during the pause period $T_P$ (the first case described above—FIG. 1b).

Alternatively, the processing unit 10 is configured for:
receiving the acquisition signal (8);
determining, as a function of the contents of the acquisition signal 8, the pause period $T_P$ and the obscuring period $T_{STOP}$ (the second case described above—FIG. 1c).

This invention also relates to a method for viewing an area 2 for processing materials with laser radiation. The method is derived directly from what is described above, which is herebelow incorporated in its entirety.

More specifically, the method comprises a first step of acquiring one image at a time of the processing area 2 according to a predetermined acquisition frequency Facq. Subsequently, the method comprises a step for displaying the images acquired on a screen visible to a user.

More specifically, the step of displaying the images is performed in such a way that the images of the processing area 2 are only displayed during pause periods $T_P$ each between respective obscuring periods $T_{STOP}$ for the emission of laser radiation. FIG. 2 shows an obscuring signal $S_2$ defined by the alternation of the times $T_P$ and $T_{STOP}$.

In accordance with this invention, the method comprises the steps of displaying on the screen the last image acquired for each pause period $T_P$ and to keep displayed on the screen the last image acquired during the subsequent obscuring period ($T_{STOP}$). During each pause period $T_P$. on the other hand, the images are displayed on the screen as they are gradually acquired.

According to the first embodiment, the step of acquiring the images is implemented only during each pause period $T_P$ and they are displayed in real time on the screen. In this embodiment, the method comprises a step of failure to acquire the images during each obscuring period $T_{STOP}$. During this step of failure to acquire the images, the method keeps displayed the last image acquired during the corresponding preceding pause period $T_P$.

According to the second embodiment, the step of acquiring the images is performed during the pause periods $T_P$, and during the obscuring periods $T_{STOP}$. The displaying step comprises a sub-step of displaying the last image acquired at the end of each pause period $T_P$, during the subsequent obscuring period $T_{STOP}$ irrespective of the images acquired during the acquisition step. In other words, according to the method of the second embodiment, the images acquired are rejected during the displaying step during the obscuring period $T_{STOP}$ (but the images continue to be acquired without interruption).

Lastly, both the embodiments comprises two alternative cases for the method. In the first case, the method comprises receiving an obscuring signal 12 representing the obscuring period $T_{STOP}$. The obscuring signal 12 is sent by the laser radiation emission device 4.

In the second case, after the acquisition step, the method comprises a step of determining, as a function of the contents of the images acquired, of the pause period $T_P$ and of the obscuring period $T_{STOP}$.

The invention achieves the preset aims.

More specifically, the aim of this invention allows a system 1 to be made for viewing an area 2 for processing materials using laser apparatuses which allows the stress to be reduced of the human eye observing the processing area 2. In effect, during the obscuring period $T_{STOP}$, the screen displays the last image acquired during the previous pause period TP. In this way, the eyes are not subjected to stress linked to the alternation between images of the processing area 2 and blank images, but continue to see images of the processing area 2 (even if during the obscuring period $T_{STOP}$ the last image acquired during the previous pause period $T_P$ is displayed).

In this way, the system makes it possible to improve the physical health of the human eye observing the processing area 2.

It should also be noted that this invention is relatively easy to implement and that the cost of implementing the invention is relatively low.

The invention claimed is:

1. A system (1) for viewing an area (2) for processing materials using laser apparatuses, comprising:
    acquisition means (6) configured to acquire one image at a time of the processing area (2) according to a predetermined acquisition frequency Facq; the acquisition means (6) being configured to generate an acquisition signal (8) containing the data relating to each image acquired;
    a screen (9) for viewing the images acquired connected to the acquisition means (6) and configured to receive the acquisition signal (8) and to make visible to the users the images contained therein;
    the system being configured in such a way that the viewing screen (9) displays the images, in real time, of the processing area (2) corresponding to the images which have been acquired only during pause periods ($T_P$) each of which is comprised between respective obscuring periods ($T_{STOP}$) during which the laser radiation is emitted; each said obscuring period ($T_{STOP}$) (a) starting before the laser emission by an advance time (Ta) function of the acquisition frequency Facq of the acquisition means (6) and (b) ending after the laser emission by a time delay (Tr) as a function of time during which the incandescence of the material processed continues;
    characterised in that the system is configured for:
    displaying on the viewing screen (9) the last image acquired for each pause period ($T_P$);
    keeping displayed on the screen, during the subsequent obscuring period ($T_{STOP}$), the last image acquired during pause period ($T_P$);
    displaying on the viewing screen (9) the images acquired during the pause period ($T_P$) following the obscuring period ($T_{STOP}$).

2. The system according to claim 1, characterised in that the acquisition means (6) are configurable between an active condition wherein they acquire images at the acquisition frequency Facq and an inactive condition wherein they do not acquire any images; during the pause period ($T_P$) the acquisition means (6) being configured in the active condition, whilst during the obscuring period ($T_{STOP}$) the acquisition means (6) being configured in the inactive condition; the acquisition means (6) being configured for generating an acquisition signal (8) containing the last image acquired of the pause period ($T_P$) and sending the signal to the display screen (9) during the entire subsequent obscuring period ($T_{STOP}$) in such a way that the display screen (9) displays this last image acquired during the obscuring period ($T_{STOP}$).

3. The system according to claim 2, characterised in that the acquisition means (6) are configured to receive an obscuring signal (12) representing at least the period during which the laser radiation (3) is emitted so as to determine the configuration of the acquisition means (6).

4. The system according to claim 2, characterised in that the acquisition means (6) are configured to determine, as a function of the contents of the acquisition signal (8), the pause period ($T_P$) and the obscuring period ($T_{STOP}$).

5. The system according to claim 1, characterised in that the acquisition means (6) are configured for acquiring images at the predetermined frequency during the pause period ($T_P$), and during the obscuring period ($T_{STOP}$); the system (1) comprising a processing unit (10) interposed between the acquisition means (6) and the display screen (9) and connected to the latter; the processing unit (10) being configured for:
receiving as input the acquisition signal (8);
processing it as a function of predetermined parameters;
sending as output a display signal (11) towards the display screen (9); the display signal (11) representing the images to be displayed on the display screen (9); the display screen (9) being configured to receive the display signal (11) and to display the contents on the screen (9); the processing unit (10) being configured for receiving the acquisition signal (8) and for generating a corresponding display signal (11) containing the images acquired solely during the pause periods ($T_P$); the processing unit (10) being configured for generating, during each obscuring period ($T_{STOP}$), the display signal (11) containing the last image acquired at the end of the preceding pause period ($T_p$) and contained in the corresponding acquisition signal (8) received, irrespective of the images acquired by the acquisition means (6).

6. The system according to claim 5, characterised in that the processing unit (10) is configured for receiving an obscuring signal (12) representing at least the period during which the laser radiation (3) is emitted.

7. The system according to claim 5, characterised in that the processing unit (10) is configured to:
receive the acquisition signal (8);
determine, as a function of the contents of the acquisition signal (8), the pause period ($T_P$) and the obscuring period ($T_{STOP}$).

8. A laser apparatus (100) for processing materials using laser radiation (3), comprising:

a laser emitting device (4) configured to emit laser radiation (3) towards an area (2) for processing the material during predefined laser emission times ($T_{LAS}$);
a system (1) according to claim 1.

9. The laser apparatus (100) according to claim 8, characterised in that the laser emitting device (4) is configured for generating an obscuring signal (12) representing at least the period during which laser radiation (3) is emitted; the system (1) being configured for receiving the obscuring signal (12) and for determining the obscuring ($T_{STOP}$) and pause periods ($T_P$).

10. A method for viewing an area (2) for processing materials using laser radiation, comprising the following operational steps:
acquiring one image at a time of the processing area (2) according to predetermined acquisition frequency Facq;
displaying the images acquired on a screen visible to a user;
the step of displaying the images being performed in such a way that the images of the processing area (2), corresponding to the images which have been acquired only during pause periods ($T_P$), are displayed in real time during said pause periods ($T_P$) each of which is comprised between respective obscuring periods ($T_{STOP}$) during which the emission of laser radiation is realized; each said obscuring period ($T_{STOP}$) (a) starting before the laser emission by an advance time (Ta) function of the acquisition frequency Facq of the acquisition means (6) and (b) ending after the laser emission by a time delay (Tr) as a function of time during which the incandescence of the material processed continues;
characterised in that it comprises the following operating steps:
displaying on the screen the last image acquired for each pause period ($T_P$),
keeping displayed on the screen, during the subsequent obscuring period ($T_{STOP}$), the last image acquired during pause period ($T_P$);
displaying on the viewing screen (9) the images acquired during the pause period ($T_P$) following the obscuring period ($T_{STOP}$).

11. The method according to claim 10 characterised in that the step of acquiring the images is only performed during each pause period ($T_P$) and in that it comprises a step of failure to acquire the images during each obscuring period ($T_{STOP}$); during the step of failure to acquire the images, the method keeps displayed the last image acquired during the corresponding preceding pause period ($T_P$).

12. The method according to claim 10 characterised in that the step of acquiring the images is performed during the pause periods ($T_P$), and during the obscuring periods ($T_{STOP}$); the displaying step comprising a sub-step of displaying the last image acquired at the end of each pause period ($T_P$), during the subsequent obscuring period ($T_{STOP}$) irrespective of the images acquired during the acquisition step.

13. The method according to claim 12, characterised in that after the acquisition step the method comprises a step of determining, as a function of the contents of the images acquired, the pause period ($T_P$) and the obscuring period ($T_{STOP}$).

* * * * *